United States Patent Office 2,801,627
Patented Aug. 6, 1957

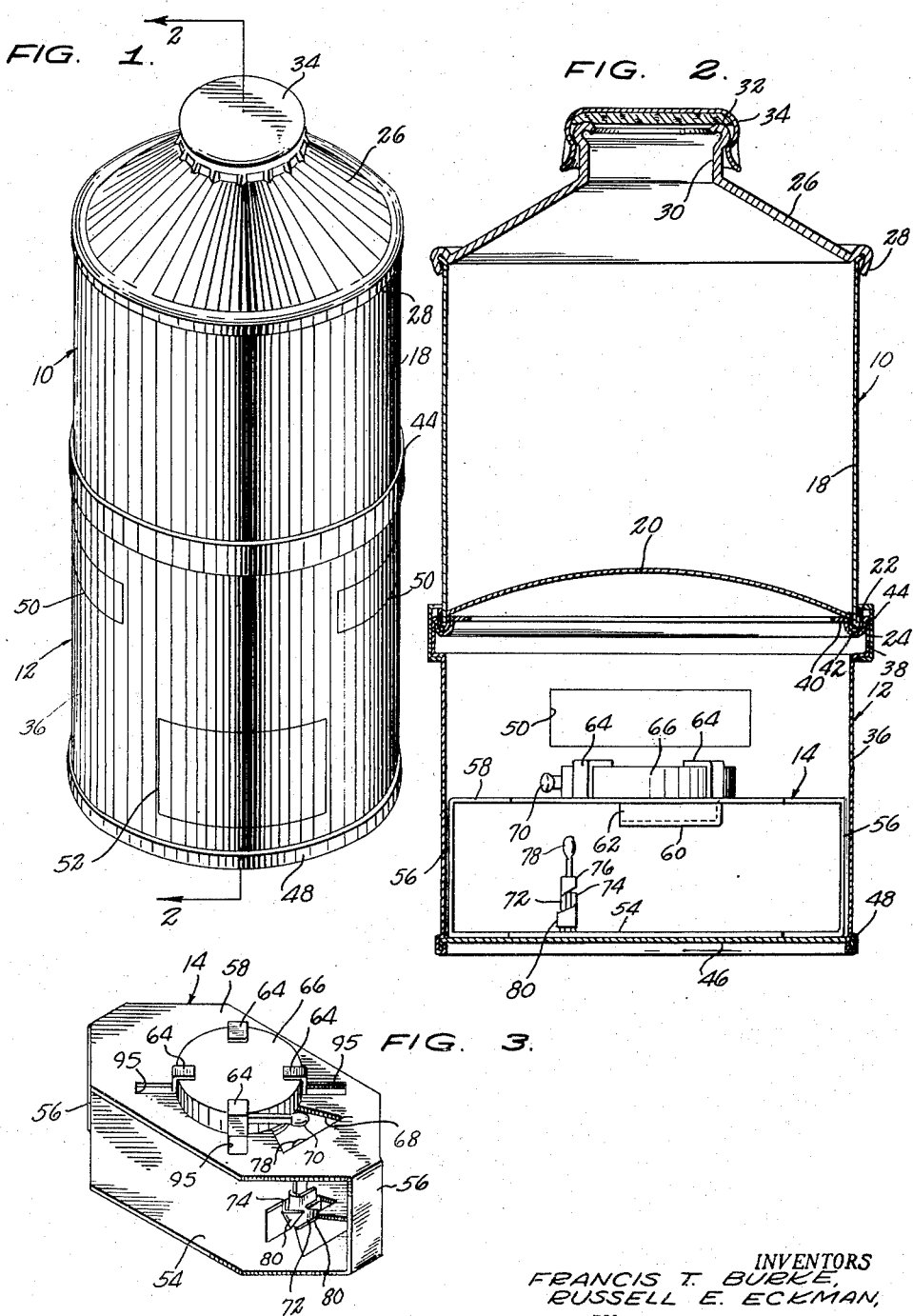
INVENTORS
FRANCIS T. BURKE,
RUSSELL E. ECKMAN,
BY
Frederick A. Zoda.
ATTORNEY.

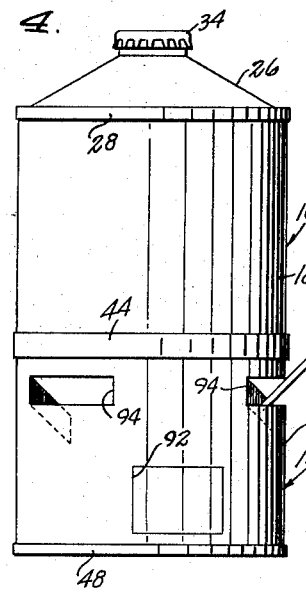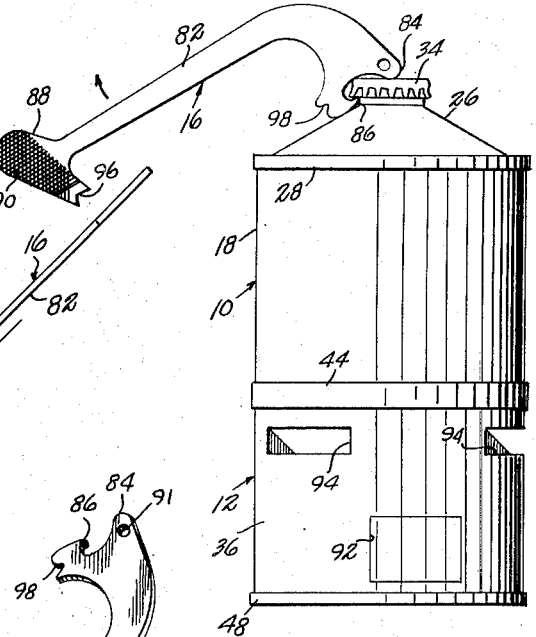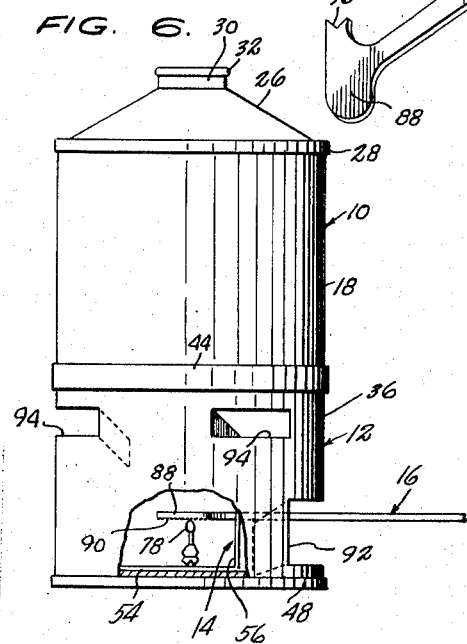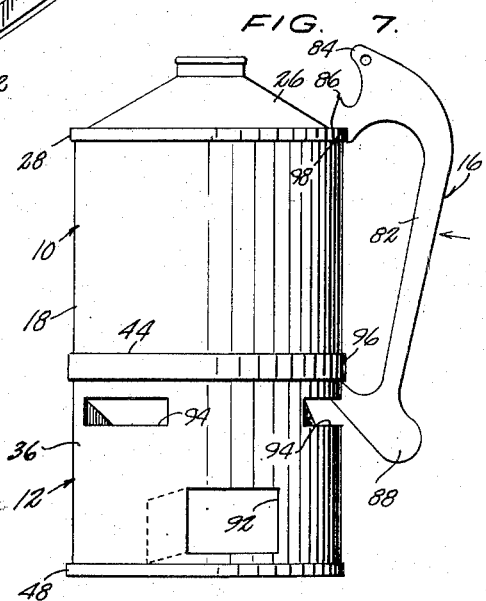

2,801,627

COMBINED CONTAINER AND HEATING MEANS THEREFOR

Francis T. Burke and Russell E. Eckman, Philadelphia, Pa.

Application July 11, 1955, Serial No. 521,028

3 Claims. (Cl. 126—262)

Heretofore, it has been proposed to provide as a unitary article of manufacture a combined container for food or other materials to be heated, and a heating means therefor.

The desirability of providing, in association with a container of the type referred to, a heating means assembled directly with the container and adapted to heat the container contents without removal of the same from said container, is well appreciated in the art to which the invention relates, since an article of this type can be conveniently packed in the kit of a camper, hunter, or fisherman, can be packed in a "survival kit" of an airman, or can be placed in a workman's lunch box to permit soup, meat, vegetables, or the like to be conveniently heated without requirement of a separate heating means, such as a fire or camp stove. Both of these may represent an unsatisfactory answer to the problem of heating food in particular situations, the first because of inability to locate fuel and also because of the difficulty of concentrating the heat properly so that a rapid and efficient heating of the container contents results, and the second because of the bulkiness of the stove and the difficulty, again, of locating suitable fuel.

The main object of the present invention is to provide a generally improved device of the type referred to, wherein the food container and the associated heating means are fixedly connected in a highly compact assembly little greater than the container itself in size. Heretofore, in the prior art devices of which we have knowledge, in some instances the container and heating means have not been compactly assembled, have been so complex in construction as to affect detrimentally their commercial feasibility, have been characterized by a lack of efficiency as regards making maximum, efficient utilization of the heat emanating from the heating means, and, finally, have not been adapted for utilization of the container itself as a food receptacle having a handle, from which receptacle the food can be conveniently poured after being heated.

In carrying out the present invention, it is proposed to eliminate the several deficiencies noted above, and summarized briefly, the device which we propose comprises fixedly connected food and heater containers, of like cross sectional shape and area so that one constitutes an extension of the other; means within the heater container for supporting a solid cake of fuel and other means within the heater container for igniting said fuel; and means in the form of a specially shaped handle and striker combined, adapted for forcing inwardly weakened portions of the heater container to provide air inlet and outlet openings, lighting the ignitable means within the heater container, removing the cap of the food container, and, finally, adapted for connection to the food and heater containers as a handle to permit consumption of the food directly from the food container or, alternatively, to facilitate pouring of the food from the container without danger of burning one's fingers.

A further object of the invention is to so locate the air inlet and outlet means in relation to the associated walls of the food and heater containers, and in relation, further, to the cake of fuel and the fuel support, as to insure maximum efficiency of the device as regards igniting of the fuel, and concentration of the heat upon the walls of the food container.

Another specific object is to form the food and heater container, and the heating means confined within the heating container, of parts which are not movable relative to one another (except for the weakened portions of the heater container), thus to simplify the construction to the maximum extent and, thereby, permit its manufacture at a minimum of cost.

Yet another object is to provide a device as stated above wherein the combination handle, striker, and vent-forming tool can be formed with specially shaped ends to facilitate its efficient discharge of its several functions while, at the same time, permitting manufacture of said tool from a single, inexpensive metal stamping.

Yet another object is to so arrange the ignitable means relative to the cake of fuel as to provide spaced ignitable elements, which can be in the form of ordinary matches, arranged to be ignited in succession one by the other, in a manner that will insure the successful lighting of the cake of fuel, in minimum time and with maximum facility, in every instance.

Other objects will appear from the following description, the claims appended thereto, and from the annexed drawing, in which like reference characters designate like parts throughout the several views, and wherein:

Figure 1 is a perspective view of a combination food container and heating means therefor formed in accordance with the present invention, as it appears before use;

Figure 2 is an enlarged vertical sectional view through the device, substantially on line 2—2 of Figure 1;

Figure 3 is a perspective view of the heater means per se;

Figures 4, 5, 6, and 7 are side elevational views, on a reduced scale, of the device at successively following stages in the use of the same; and Figure 8 is a perspective view of the combination handle, vent-forming, and striker tool per se.

The device constituting the present invention may be appropriately considered as comprising four main components, these being a food container generally designated 10, a heater container generally designated at 12, a heater 14, and a combination handle, striking, and vent-forming tool 16. Each of these will be described in turn hereinafter.

Considering first the food container 10, this includes a cylindrical body 18 of thin sheet metal having a suitably high rate of thermal conductivity. The body 18 is initially formed open at its opposite ends, and the open lower end thereof, during manufacture of the device, is closed by an upwardly concavo-convex bottom 20. The bottom edge of the body 18 has a circumferential, folded-over lip 22, and rolled over said lip is the marginal portion 24 of the bottom 20, providing a permanent, sealed connection between body 18 and the bottom 20.

At its upper end, the body 18 is connected to a frustro-conical top portion 26, the base end of which is rolled at 28 over the upper end of the cylindrical body 18, again providing a sealed, permanent connection. At its upper, smaller end, top portion 26 is integrally formed with an upstanding, low, cylindrical neck 30 terminating at its upper end in an inwardly directed circumferential lip 32, and a conventional crown cap 34 is applied to the neck to sealably close the container outlet defined thereby.

The heater housing or container 12 includes a cylindrical body 36 of a cross sectional shape and diameter corresponding to that of body 18, so that the heater housing constitutes, in effect, an extension of the food container, facilitating packaging of the device for shipment, or storage within a camper's pack or kit. At its upper end, the cylindrical body 36 has a circumferentially extending, outwardly offset part 38 terminating at its upper end in an inwardly directed, circumferential, flange 40 formed with a continuous, upwardly facing groove 42 receiving the depending, rolled marginal portion 24 of the bottom plate 20. A clamping or connecting band 44, of C-shaped cross section, extends about the full circumference of the device. Band 44, when viewed in cross section as in Figure 2, is in embracing relation to the outwardly offset part 38, the marginal portion 24 of bottom 20, and the rolled lip 22 of body 18. The outwardly offset part 38, considered from the standpoint of its relationship to the top structure defined by the food container 10, and the bottom structure defined by the heater housing 12, projects outwardly, through the full circumference of the device, from the main or body portions of said structures, defining at the bottom of said offset part 38 a downwardly facing shoulder. The rolled lip 22 and marginal portion 24 are also projected laterally outwardly beyond the normal vertical line defined by the side walls of the top and bottom structures, with the top surface of the marginal portion 24 defining an upwardly facing shoulder. These shoulders are engaged by the top and bottom walls of the clamping band 44, so that the permanent connection of the food container 10 and heater housing 12 is provided by clamping engagement of the band 44 with the offset part 38 of the bottom structure or heater housing 12, and with the marginal portion 24 formed on the bottom 20 of the top structure or food container 10.

The heater housing has a closed, flat bottom 46 having at its periphery a bead 48 rolled over the lower end of the housing 36, and at uniformly spaced locations about the circumference of the upper end portion of body 36, there are provided weakened lines 50 each of which circumscribes a rectangular area elongated in a direction circumferentially of the device, for a purpose to be made presently apparent. Adjacent the lower end of the heater housing, there is provided a weakened line 51, also circumscribing a rectangular area, a single weakened line 52 being provided with the area bounded thereby being substantially larger than the area bounded by any of the weakened lines 50.

The heater 14 has been shown per se in Figure 3, and is formed from sheet metal or other material, a single piece of which is sufficient to provide the means for supporting the cake of fuel, as well as the means for supporting the spaced matches or other ignitable elements to be described hereinafter. The single piece of sheet metal is shaped to include a flat bottom 54 seating upon the bottom 46 of the heater housing, and tapered at its opposite end so as to fit snugly within the heater housing in a position extending diametrically thereacross. Projecting upwardly from the opposite extremities of the heater base 54 are supports 56, extending along diametrically opposite portions of the body 36 as shown in Figure 2, and integrally connected at their upper ends to the opposite ends of a support ledge 58, tapered correspondingly to the base 54 with its periphery in registration with the periphery of said base 54.

Centrally in the ledge 58, there is pressed downwardly out of the material thereof a depression 60, of circular configuration, one portion of which is cut away as at 62. Struck upwardly and inwardly out of the material of the ledge 58, at uniformly spaced locations about the circumference of the depression or downwardly indented portion 60 are ears 64 of inverted L-shape, adapted to be engaged against a flat, circular cake of solid, ignitable fuel 66 known per se in the art.

Initially, the cake of fuel 66 is greater in diameter than the diameter of the depression 60, and hence is supported above the depression 60 upon ledge 58, in concentric relation to the depression. As the fuel burns, however, its diameter is progressively reduced, and ultimately, it will drop into the depression 60.

At the location of the large opening 62 formed in the side and bottom wall of the depressed portion 60, the ledge 58 is formed with an opening 68 (Figure 3), and extending over said opening, with its head disposed centrally of the opening, is a conventional match 70 or other ignitable element, the stem of which is gripped between one of the ears 64 and the side surface of the fuel cake 66.

Below the opening 68, there are struck upwardly out of the material of the base 54 clamping members 72, 74. Member 72 flares upwardly in a direction away from the base 54, that is, it is increased progressively in width, while member 74 is oppositely formed, tapering upwardly to progressively reduce its width in the direction of its upper end. Clamping member 72 extends to a greater height than the member 74, and the upper corner portions of the member 72 are folded inwardly to provide clamping lips 76 engaging about the stem of an upstanding match 78 gripped between the members 72, 74. The lower corners of the member 74, in turn, are folded inwardly about the reduced-width base of the member 72, providing clamping means 80. By reason of this arrangement, a firm clamping engagement of the match 78 results, with the head of the match 78 being disposed below the plane of the ledge 58, in a position in which flame caused by igniting of the match 78 will be directed upwardly through the opening 68 and will impinge upon the head of match 70, igniting said match 70 and, in turn, the cake of fuel.

The combination handle, striker, and vent-forming tool 16 is also formed from a single piece of material, stamped to the outer configuration shown to particular advantage in Figures 5 and 8. The tool includes an elongated handle portion 82, terminating at one end in a nose 84 spaced from a hook 86, with a recess intervening between the nose and hook to receive the marginal part of the crown cap 34 (Figure 5), the nose pressing downwardly upon the center portion of the cap and the hook engaging under the edge of the cap so that, when the handle portion 82 is rocked upwardly in the direction of the arrow shown in Figure 5, the cap will be removed. At its other end, handle portion 82 is integrally formed with a cross head 88, one surface of which is serrated or roughened as at 90 to provide a friction-producing surface which, when pulled over the head of match 78 (Figure 6), will ignite said match. A small opening 91 can be provided in one or the other ends of the tool 16, to permit it to be hung upon a supporting nail, or, alternatively, suspend it from a cord passed about the container to keep the tool with the container before use of the device.

In use of the device, the tool 16 is first used to form a large opening 92, and smaller openings 94 in the heater housing 12. This is accomplished by pressing inwardly upon the area circumscribed by the weakened line 52, to form the opening 92, with the material pressed against by the selected end of the tool being forced inwardly within the container. The tool is similarly applied in the direction of the arrow shown in Figure 4, to press inwardly the material of the areas bounded by the weakened lines 50, to form the air outlet openings 94. The opening 92 is disposed below the plane of the ledge 58 on which the cake of fuel 66 is supported, while the outlet openings 94 are located above said plane.

The cap 34 is next removed, as shown in Figure 5, and as a next step, the striker is inserted through the opening 92 and the cross head 88 is placed in engagement at one end with the head of match 78. With the tool 16 held in a horizontal plane, the tool is swung laterally within said plane, so as to cause the roughened surface 90 to traverse the head of match 78 from end to end of said roughened surface, thus to ignite the match 78. The flame resulting from ignition of the match will be directed upwardly through opening 68 and will ignite match 70, and the combined flames of both matches will now impinge upon the surface of the fuel cake 66, igniting the same.

When the cake 66 is burning, air enters the heater housing through opening 92, and passes upwardly through opening 68 as well as through openings 95 formed in the ledge 58 at intervals angularly spaced about the periphery of the fuel cake by striking of the ears 64 upwardly from the material of the ledge. The several currents of air, passing in close proximity to the cake of fuel, will cause the fuel to burn steadily, and in addition, the air will of course impinge upon the underside of the fuel cake, where it is exposed due to the provision of the large opening 62 of depression 60.

As combustion continues, the fuel cake will be reduced in size, and will ultimately drop into the depression, burning with a steady flame with the heat concentrated upon the concave underside of the bottom 20. The concavity of the bottom 20 of the food container causes the heat to be directed into a recess formed by said convexity, thus concentrating the heat upon the center portion of the container bottom, and providing for a minimum loss of heat through the air outlet opening 94.

When the contents of the container have been fully heated and the fuel cake has been fully consumed, the tool 16 may now be applied in the manner shown in Figure 7, as a handle facilitating dispensing of the container contents directly from the food container 10, or, probably more usually, pouring of the container contents from said container 10. The cross head 88 is formed with a notch 96, while a confronting notch 98 is formed in the opposite, enlarged end portion of the tool, the notch 96 receiving the upper edge of one of the air outlets 94, and the notch 98 receiving the rolled marginal part 28 of the top portion 26. It will be understood that the construction is such as to permit the tool to be rocked in the direction of the arrow shown in Figure 7 after engagement of the upper edge of opening 94 in notch 96, the rounded formation of the marginal rolled part 28 and of the notch 98 permitting the tool to be snapped into engagement with the upper end portion of the food container 10.

Following use of the device, it would ordinarily be disposed of, but reuse is possible for heating various liquids, etc., by placing a new cake of fuel on the ledge and by inserting new matches in the positions shown.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor change in construction that may be permitted within the scope of the appended claims.

What is claimed is:

1. In a device for holding a quantity of food or the like and for heating the same, of the type comprising an upstanding container for a substance to be heated, said container having a closed bottom, and a heater housing having a side wall connected to the periphery of said bottom and forming a lower extension of the container, the improvement comprising: a fuel support in the housing including a base, legs extending upwardly from the base, and a ledge carried by said legs, said ledge having a centrally depressed portion and including a plurality of ears stuck upwardly out of the material of the ledge and angularly spaced about said depressed portion; a quantity of fuel supported upon said ledge and engaged in position over said depressed portion by the ears, said fuel on partial consumption of the same being adapted to gravitate into the depressed portion; and ignitable means carried by said support extending in proximity to said fuel for effecting combustion of the same, comprising a first ignitable element extending upwardly from said base and a second ignitable element clampably engaged between one of said ears and said fuel above the first element, said ledge and depressed portion having communicating openings providing an air passage and said ignitable elements being disposed in the path of air moving through said passage.

2. In a device for holding a quantity of food or the like and for heating the same, of the type comprising an upstanding container for a substance to be heated, said container having a closed bottom, and a heater housing having a side wall connected to the periphery of said bottom and forming a lower extension of the container, the improvement comprising: a fuel support in the housing including a base, legs extending upwardly from the base, and a ledge carried by said legs, said ledge having a centrally depressed portion and including a plurality of ears stuck upwardly out of the material of the ledge and angularly spaced about said depressed portion; a quantity of fuel supported upon said ledge and engaged in position over said depressed portion by the ears, said fuel on partial consumption of the same being adapted to gravitate into the depressed portion; and ignitable means carried by said support extending in proximity to said fuel for effecting combustion of the same, comprising a first ignitable element extending upwardly from said base and a second ignitable element clampably engaged between one of said ears and said fuel above the first element, said ledge and depressed portion having communicating openings providing an air passage and said ignitable elements being disposed in the path of air moving through said passage, the base including upwardly struck clamping members adapted to engage between them the first ignitable element.

3. In a device for holding a quantity of food or the like and for heating the same, of the type comprising an upstanding container for a substance to be heated, said container having a closed bottom, and a heater housing having a side wall connected to the periphery of said bottom and forming a lower extension of the container, the improvement comprising: a fuel support in the housing including a base, legs extending upwardly from the base, and a ledge carried by said legs, said ledge having a centrally depressed portion and including a plurality of ears struck upwardly out of the material of the ledge and angularly spaced about said depressed portion; a quantity of fuel supported upon said ledge and engaged in position over said depressed portion by the ears, said fuel on partial consumption of the same being adapted to gravitate into the depressed portion; and ignitable means carried by the support extending in proximity to said fuel for effecting combustion of the same, comprising a first ignitable element extending upwardly from said base and a second ignitable element clampably engaged between one of said ears and said fuel above the first element, said ledge and depressed portion having communicating openings providing an air passage and said ignitable elements being disposed in the path of air moving through said passage, the base including upwardly struck clamping members adapted to engage between them the first ignitable element, one of said clamping members having upper corner portions folded about said first ignitable element, the other clamping member having lower corner portions folded about the first clamping member.

References Cited in the file of this patent

UNITED STATES PATENTS

| 172,129 | Klein | Jan. 11, 1876 |
| 824,938 | Lang | July 3, 1906 |

(Other references on following page)

UNITED STATES PATENTS

| | | |
|---|---|---|
| 1,209,676 | Cooper | Dec. 26, 1916 |
| 1,437,073 | Popper | Nov. 28, 1922 |
| 1,487,377 | Gaynor | Mar. 18, 1924 |
| 1,739,138 | Giragosian | Dec. 10, 1929 |
| 1,934,339 | Winberg | Nov. 7, 1933 |
| 1,943,585 | Cummins | Jan. 16, 1934 |
| 2,003,714 | Johnson | June 4, 1935 |
| 2,101,180 | Jacobs | Dec. 7, 1937 |
| 2,327,412 | Fink | Aug. 24, 1943 |
| 2,584,040 | Naranick | Jan. 29, 1952 |
| 2,665,936 | Moore | Jan. 12, 1954 |

FOREIGN PATENTS

| | | |
|---|---|---|
| 375,833 | Great Britain | June 30, 1932 |
| 195,922 | Switzerland | May 2, 1938 |